US009088661B2

(12) United States Patent
Surty et al.

(10) Patent No.: US 9,088,661 B2
(45) Date of Patent: Jul. 21, 2015

(54) HANDS-FREE VOICE/VIDEO SESSION INITIATION USING FACE DETECTION

(75) Inventors: Aaron S. Surty, Toronto (CA); Adrian Lee-Kwen, Toronto (CA); David Beilis, Vaughan (CA)

(73) Assignee: GENESYS TELECOMMUNICATIONS LABORATORIES, INC., Daly City, CA (US)

(*) Notice: Subject to any disclaimer, the term of this patent is extended or adjusted under 35 U.S.C. 154(b) by 0 days.

(21) Appl. No.: 13/196,304

(22) Filed: Aug. 2, 2011

(65) Prior Publication Data

US 2013/0034262 A1 Feb. 7, 2013

(51) Int. Cl.
- G06K 9/00 (2006.01)
- H04M 1/27 (2006.01)
- H04M 1/725 (2006.01)
- H04N 7/18 (2006.01)
- H04M 1/677 (2006.01)

(52) U.S. Cl.
CPC .......... *H04M 1/72522* (2013.01); *H04N 7/186* (2013.01); *H04M 1/27* (2013.01); *H04M 1/271* (2013.01); *H04M 1/6775* (2013.01); *H04M 1/72588* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 6,018,668 A | 1/2000 | Schmidt | |
| 7,130,454 B1 | 10/2006 | Berube et al. | |
| 7,317,911 B2 * | 1/2008 | Brenig et al. | 455/418 |
| 7,404,001 B2 | 7/2008 | Campbell et al. | |
| 7,688,967 B2 | 3/2010 | Patel et al. | |
| 7,930,555 B2 | 4/2011 | Bell | |
| 2001/0028703 A1 | 10/2001 | Katseff et al. | |
| 2002/0131623 A1* | 9/2002 | Musgrave et al. | 382/117 |
| 2002/0152390 A1* | 10/2002 | Furuyama et al. | 713/185 |
| 2002/0176565 A1 | 11/2002 | Decrouy et al. | |
| 2007/0040026 A1* | 2/2007 | Vleet et al. | 235/383 |
| 2007/0120970 A1* | 5/2007 | Goffin | 348/14.16 |
| 2007/0283296 A1* | 12/2007 | Nilsson | 715/863 |
| 2008/0122919 A1* | 5/2008 | Cok et al. | 348/14.01 |
| 2008/0204564 A1* | 8/2008 | Yumiki | 348/208.99 |
| 2009/0046900 A1 | 2/2009 | Ogawa | |
| 2009/0110246 A1 | 4/2009 | Olsson et al. | |
| 2009/0116684 A1 | 5/2009 | Andreasson | |
| 2009/0160609 A1 | 6/2009 | Lin et al. | |
| 2009/0170562 A1 | 7/2009 | Kujala et al. | |
| 2010/0149303 A1 | 6/2010 | Thorne et al. | |
| 2011/0141220 A1* | 6/2011 | Miura | 348/14.02 |
| 2011/0151934 A1* | 6/2011 | Geng | 455/565 |
| 2012/0033026 A1* | 2/2012 | Murphy | 348/14.01 |
| 2013/0015946 A1* | 1/2013 | Lau et al. | 340/5.2 |

OTHER PUBLICATIONS

International Search Report and the Written Opinion of the International Searching Authority dated Nov. 5, 2012 for PCT/US2012/049366, 10 pages.

* cited by examiner

*Primary Examiner* — Jon Chang
(74) *Attorney, Agent, or Firm* — Christie, Parker & Hale, LLP (57) ABSTRACT

A communication system includes a telecommunication appliance connected to a communication network, an image acquisition appliance coupled to the telecommunication appliance, software executing on the telecommunication appliance from a non-transitory physical medium, the software providing a first function enabling detecting that an image acquired by the camera comprises a human face in at least a portion of the image, and a second function initiating a communication event directed to a pre-programmed destination, the second function initiated by the first function detecting the human face image portion.

20 Claims, 5 Drawing Sheets

Fig. 5

HANDS-FREE VOICE/VIDEO SESSION INITIATION USING FACE DETECTION

BACKGROUND OF THE INVENTION

1. Field of the Invention

The present invention is in the field of telecommunications and pertains particularly to methods and apparatus for hands-free initiation of a communications session between two or more parties over a network.

2. Discussion of the State of the Art

In the art of telecommunication, hands-free communication is an important goal for companies that provide communications appliances and mobile software applications. In typical voice communications, there are a number of regimens that seek to provide mostly hands-free initiation of telephone calls. These include voice activation whereby a user says the name of a contact and then says call, whereby the communications appliance enabled with voice recognition initiates a call based on the spoken commands of the user. Earpieces are commonplace and enable communication in a hands-free fashion on many appliances once the call is in progress. Speed dialing by touching a single button to initiate a communication session is also very common.

A challenge with complete hands-free initiation of a voice/video session between two communications appliances over a network is that current hands-free protocols are too cumbersome for some users, especially those who are not computer literate such as very young children or others with no prior computing experience. Moreover, some prior knowledge of the process for initiating the two-way voice/video call is required. Therefore, what is clearly needed is a system for hands-free voice/video session initiation using face detection.

SUMMARY OF THE INVENTION

The problem stated above is that simplicity is desirable for initiating a telecommunications session over a digital network, but many of the conventional means for initiating a telecommunications session such as selecting a destination and manually or voice dialing a number, also include complexity whereby tasks are manually initiated. The inventors therefore considered functional elements of a telephony application, looking for elements that exhibit interoperability that could potentially be harnessed to provide voice and video connection but in a manner that would not add more work for the initiator.

Every communications system is characterized by efficiency and simplicity, one by-product of which is an abundance of users communicating via the system. Most such telecommunications systems employ telecommunications appliances with video capability to conduct communications sessions over the prevailing network, and communications appliances having connectivity to a communications network are typically a part of such apparatus.

The present inventor realized in an inventive moment that if, at the point of initiation of a telecommunications session, the face of the user could be detected and the fact of detection could initiate a communication event, significant advantages would accrue.

In one embodiment of the invention a communication system is provided, comprising a telecommunication appliance connected to a communication network, an image acquisition appliance coupled to the telecommunication appliance, and software executing on the telecommunication appliance from a non-transitory physical medium. The software provides a first function enabling detecting that an image acquired by the camera comprises a human face in at least a portion of the image, and a second function initiating a communication event directed to a pre-programmed destination, the second function initiated by the first function detecting the human face image portion.

Also in one embodiment the image acquisition device is coupled to the telecommunication appliance by a network. Still in one embodiment the image acquisition device is physically integrated into the telecommunication appliance. In these embodiments telecommunication appliance may be an iPad2, an iPhone4, a computer, or an android device.

In one embodiment of the communication system the image acquisition device is a video camera, and the communication event is a video call initiated by the telecommunication appliance to the destination. IN another embodiment the telecommunication event is a voice call initiated by the telecommunication appliance to the destination.

In yet another embodiment of the invention the telecommunication event comprises an image of at least the portion of the acquired image determined to represent a human face by the first function, and further comprising a third function enabling automatic answering of an incoming call voice or video call at the telecommunication appliance. In yet another, there is a fourth function for recognizing a specific facial expression in an image of a human face acquired by the video camera, and initiating one or more specific actions accordingly.

In another aspect of the invention a communication method is provided, comprising the steps of: (a) acquiring an image by an image acquisition device; (b) providing the image to a telecommunication appliance connected to a communication network; (c) detecting, by the telecommunication appliance, an image of a human face in a portion of the image acquired; (d) initiating a communication event directed to a pre-programmed destination as a result of the detection of the image of a human face in step (c). In one embodiment the image acquisition device is coupled to the telecommunication appliance by a network. Also in one embodiment the image acquisition device is physically integrated into the telecommunication appliance. In the integrated case the telecommunications appliance may be an IPAD2, an IPHONE4, a computer, or an ANDROID device.

In another embodiment of the present invention the image acquisition device is a video camera, and the communication event is a video call initiated by the telecommunication appliance to the destination. In yet another, the telecommunication event is a voice call initiated by the telecommunication appliance to the destination.

In still another embodiment the communication event comprises an image of at least the portion of the acquired image determined to represent a human face by the first function, and further comprising a third function enabling automatic answering of an incoming call voice or video call at the telecommunication appliance. In yet another, a fourth function is provided for recognizing a specific facial expression in an image of a human face acquired by the video camera, and initiating one or more specific actions accordingly.

DETAILED DESCRIPTION

The inventors provide a communications system for enabling voice and video calls through facial detection of a human operator. The present invention is described in enabling detail using the following examples, which may describe more than one embodiment falling within the scope of the present invention.

Figure 1:
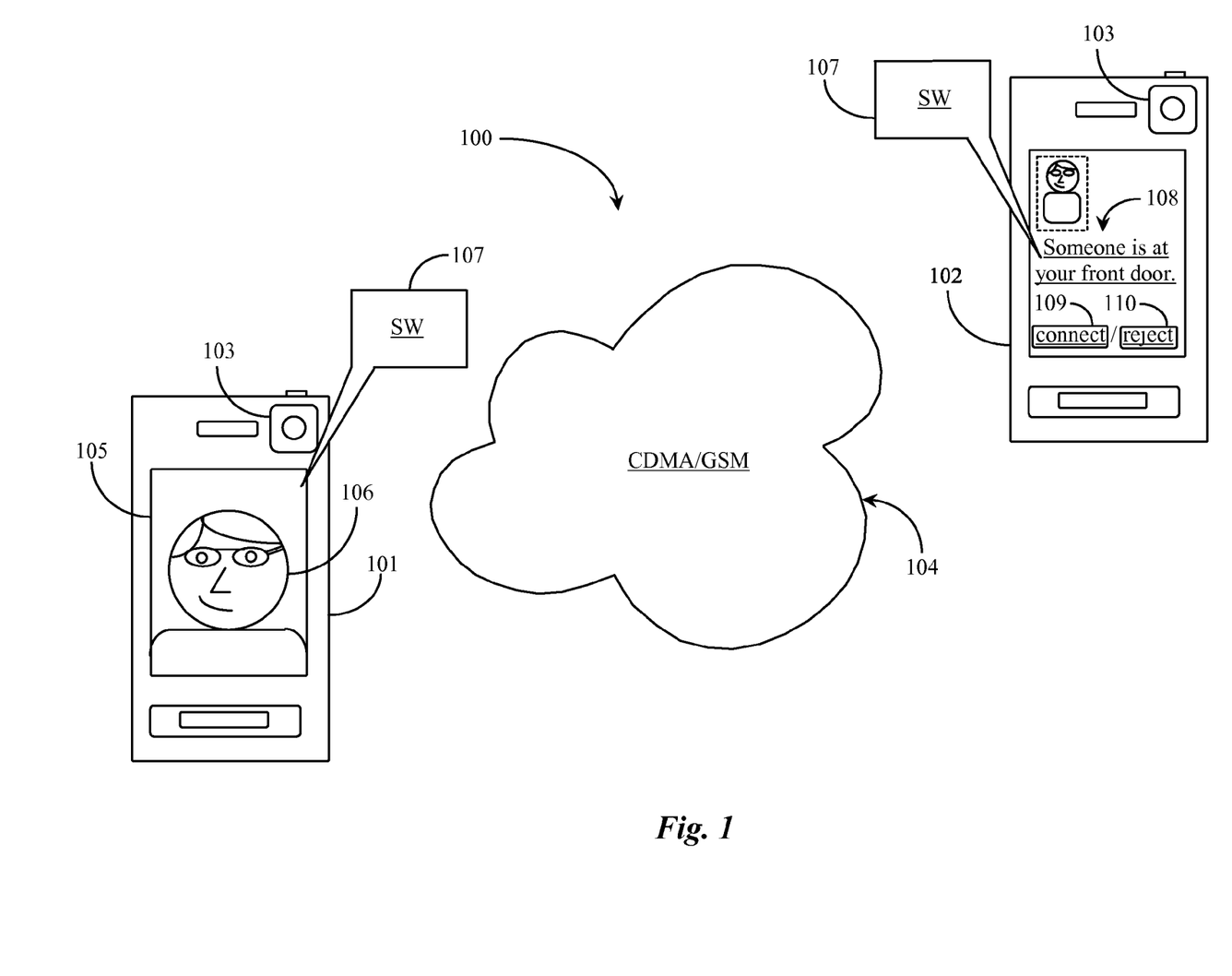
FIG. 1 is an architectural view of a communications network supporting two-way video and voice communication initiated through face detection according to an embodiment of the present invention.

FIG. 1 is an architectural view of a communications network 100 supporting two-way video and voice communication initiated through face detection according to an embodiment of the present invention. Communications network 100 may include a wireless carrier network 104. Wireless network 104 may include a code division multiple access (CDMA) network, a global system for mobile communications (GSM) network, another wireless carrier network type or a combination of these. Examples are WiFi, WiMax or LTE, essentially any 3G or 4G network.

Carrier network 104 supports voice and video communications between mobile communications appliances. A communications appliance 101 is illustrated in this example and has connectivity to network 104. Appliance 101 may be an android, a cellular telephone, a smart hand-held personal computer (PC), or any other communications appliance. In a preferred embodiment, communications appliance 101 has a forward facing camera lens 103. By forward facing, it is meant to mean that the camera aperture is on the same side of the appliance as the display. Appliance 101 may be a touch screen appliance without departing from the spirit and scope of the present invention.

Appliance 101 includes a visual display window 105. In this example, camera 101 is displaying the face 106 of a user who wishes to initiate a voice/video communication session with another appliance over network 104. To initiate communication between the instant appliance 101 and another appliance over the network, a face-detection software (SW) 107 is provided to reside on and execute from a non-transitory medium coupled to appliance 101. Face detection SW 107 is adapted to monitor for the presence a human face, preferably the face of the appliance owner when the user looks into the forward-facing camera lens while SW 107 is running on the device.

SW 107 then uses the camera function to acquire a still picture of the user and packages the photo into a session initiation request that is propagated from the initiating appliance to a targeted appliance over network 104. A second communications appliance 102 is illustrated in this example and has access to wireless network 104. Appliance 102 may be an android, a cellular telephone, a smart hand-held personal computer (PC), or any other communications appliance. In a preferred embodiment, communications appliance 102 has a forward facing camera lens 103. In the present example of the invention, communications appliance 101 is initiating a request for a video/voice telephony session from appliance 102.

Appliance 102 may be a same or similar appliance as appliance 101. In one embodiment the initiating and receiving appliances may be a fixed appliances instead of mobile appliances without departing from the spirit and scope of the present invention. Appliance 102 has a forward facing camera 103 and has an instance of face-detection SW 107 residing and executing from a non-transitory medium on the appliance. Once appliance 101 running SW 107 has taken a photo 106 of the requestor, the photo along with a request for communication is automatically propagated over network 104 to, in this case appliance 102.

Appliance 102 displays a thumbnail picture received photo 106 in the right upper corner of the display when the request for a session is received over network 104. A text message 108 informs the recipient "Someone is at your front door". Message 108 may be worded differently than the message illustrated without departing from the spirit and scope of the present invention. In this example, the recipient has an option of connecting to the requesting user in a voice and video session by hitting a connect button 109. In one embodiment the recipient of photo 106 simply clicks on or activates the photo in order to launch a video/voice communication session. The recipient may reject the request by clicking on a reject button 110.

When the recipient accepts the communication request, a voice/video session is launched and may be answered as an incoming communication at the requestor's end (appliance 101) by having an automatic answering function turned on. This makes the session initiation from the point of the requestor 100 percent hands free accept perhaps what it takes to "look into" the forward facing camera. In one embodiment, the requesting appliance 101 is a stationary appliance or is mounted in a stationary fashion with speakerphone and video enabled.

Face detection enables a very young person, perhaps of three or four years of age, to request a voice/video session with a pre-programmed recipient such as a parent or guardian. The system of the invention enables disabled persons who otherwise cannot operate complex electronic devices to request a voice/video session with a preprogrammed recipient. In one embodiment, voice recognition enables a user operating appliance 101 to call out a contact that has a number listed on the appliance or to call out a number before the video/voice request in generated. In one embodiment, a list of numbers can be utilized for multiple requests of a video/voice session and the appliance may auto-answer the first responder.

Figure 2:
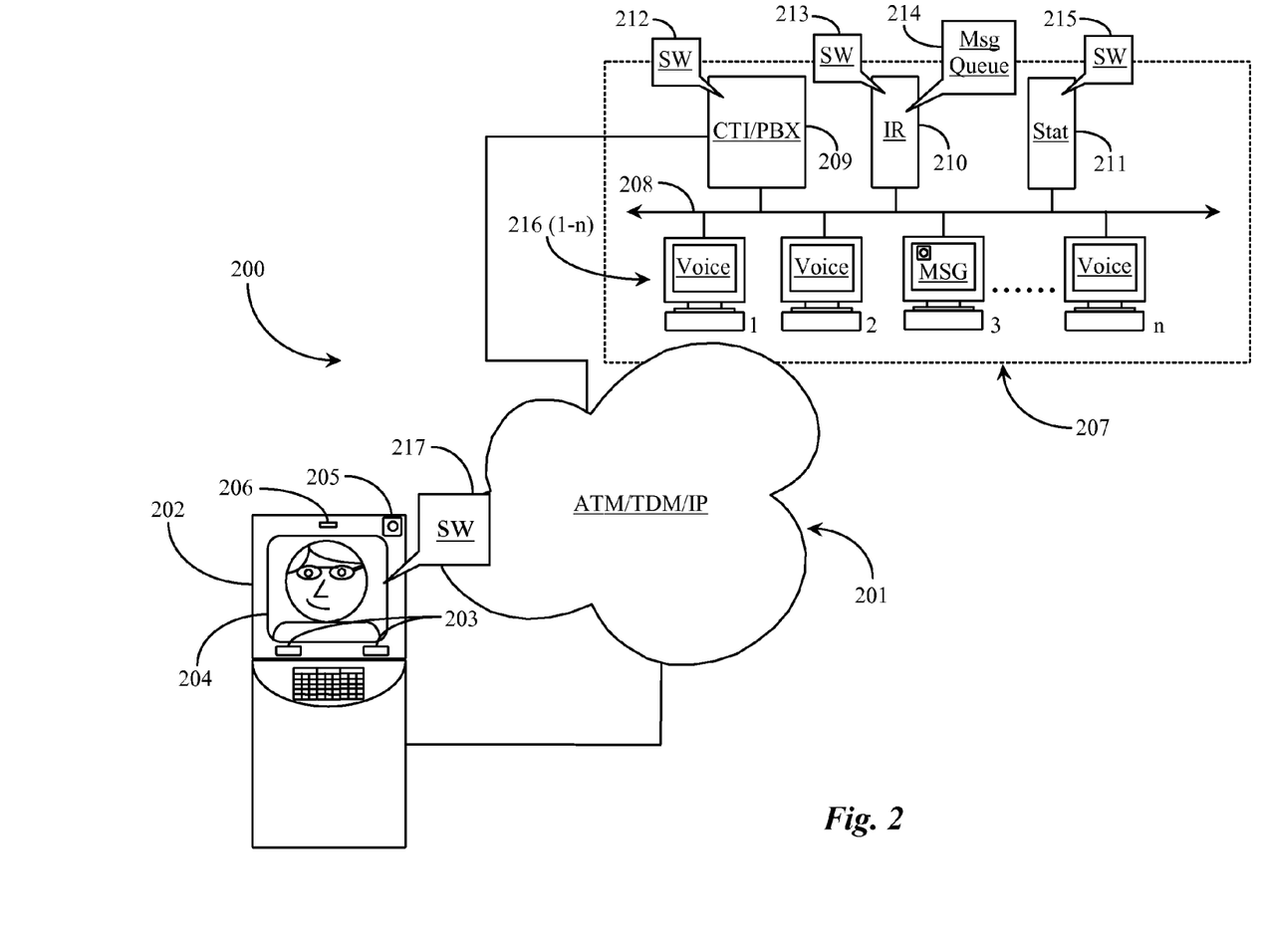
FIG. 2 is an architectural view of a sales network supporting face-detect initiation of a service call from an enabled kiosk according to an embodiment of the present invention.

FIG. 2 is an architectural view of a sales network 200 supporting face-detect initiation of a service call from an enabled kiosk according to an embodiment of the present invention. Sales network 200 includes a call-in center 207 that is accessible over a data network 201, that may include an automated transaction machine (ATM) network, a time division multiplexing (TDM) network, or an Internet protocol (IP) network or a combination of these. In this example, a kiosk, or an ATM terminal 202 is provided for customers to make contact with a sales or service representative of a store hosting the kiosk and network. Terminal 202 enables a customer to communicate with a rep and purchase a product.

An instance of face detection SW 217 is provided to reside on and execute from a non-transitory medium coupled to terminal 202. SW 217 enables initiation and launch of a voice/video request. Terminal 202 includes two speakers 203, a microphone 206 and a forward facing camera 205. Terminal 202 includes a large display screen 204. When a user steps in front of the camera, the likeness of the user is displayed on screen and an image of the user is acquired and propagated over network 201 to call-in center 207.

Call-in center 207 represents any local or remote group of service representatives enabled for telephony communications. Call-in center 207 includes a local area network (LAN) 208 that is enabled for Internet Protocol (IP) telephony. A service center may take incoming calls through a computer telephony integration (CTI)-enabled private branch exchange (PBX) switch 209. Switch 209 is connected to LAN 208 and to carrier network 201. In one embodiment, incoming calls are intercepted by an interactive voice response (IVR) unit, not illustrated but assumed present in this example. CTI SW 212 resides on a non-transitory medium coupled to switch 209 and provides intelligent routing routines for agent level routing of incoming calls.

LAN 208 supports a collection of agent workstations 216 (1-n). Workstations 216 (1-n) are adapted as communications terminals manned by live agents or knowledge workers. Each station is represented herein by a personal computer (PC) that is directly connected to LAN 208. Telephone handsets or headsets may also be assumed present in this example though they are not specifically illustrated.

LAN 208 supports an interaction routing (IR) server 210. Server 210 is aided by software 213 residing on and executable from a non-transitory medium on the server. Interaction routing server 210 also includes a message queue 214. Message queue 214 is adapted to contain communications requests that are waiting to be routed to a live agent. Communications requests are also held in PBX 209. In this example, the call-in center differentiates between normal incoming traffic and incoming requests resulting from kiosk interaction at host storefronts. LAN 208 supports a statistics (Stat) server 211. Statistics server 211 includes software 215 resident on and executable from a non-transitory medium that aids in compiling and reporting call-center statistics to requesting entities.

If a user wishes to request a communications session with a live agent from call-in center 207, the user simply looks into the camera in front of the terminal. SW 217 aids in generating a communications request including the image acquired at the time of the request. The communications request may be propagated over network 201 to switch 209. IVR SW may intercept the call and may determine if it is a call incoming from the network or one incoming from a host terminal such as terminal 202. Workstations 216 (1), 216 (2), and 216 (n) are busy handling voice calls. In one embodiment, the destination party is a video/voiceXML-automated script and the call is launched from the mobile telecommunications appliance upon detection of a face.

Workstation 216 (3) has received a routed message with a thumbnail picture attached indicating it is from a Kiosk interaction where the operator wishes to engage in a voice/video session with a live agent. The agent operating station 216 (3) may answer the request by double clicking the thumbnail, which immediately launches a voice/video session between the agent and a user operating the kiosk. In another embodiment, the operator of terminal 202 steps in front of the kiosk, looks into the camera, and the terminal camera acquires an image and sends a normal voice/video call to call-in center 207 for further agent level routing as an incoming voice/video call.

In one embodiment, the present invention may be deployed as an intercom system that connects visitors to a home with a remote homeowner that is not physically on the premises. In this case the display screen with a forward-facing camera is a fixed telecommunications device or terminal that the visitors may step in front of to automatically initiate a voice/video session. In one embodiment, a public event may have a terminal that performs, using the present invention, as a telecommunications device for interviewing and registering members of the public whereby media uploads and video/voice confirmation may be practiced.

Figure 3:
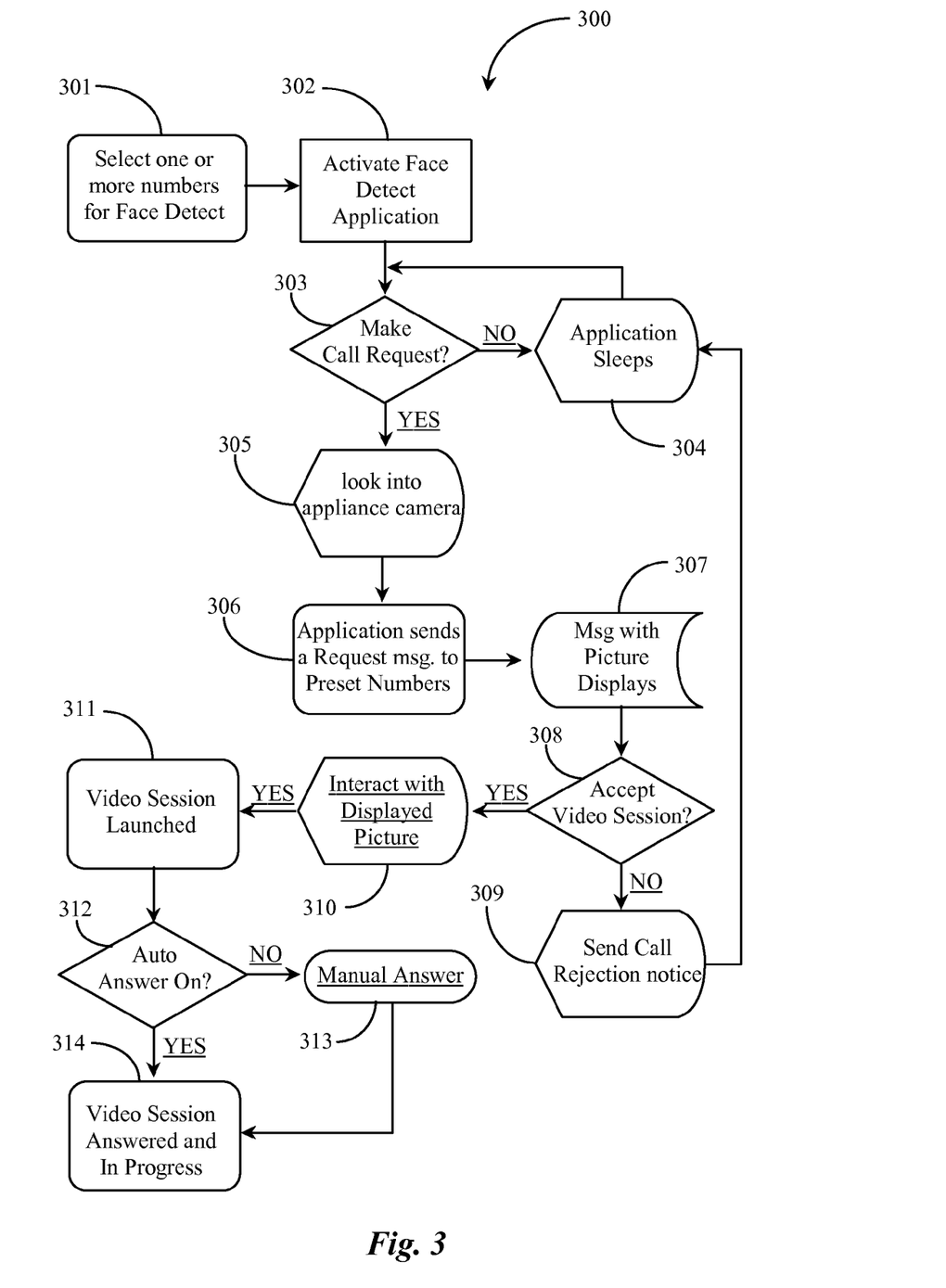
FIG. 3 is a process flow chart illustrating steps for initiating two-way voice and video communication using face detection according to the embodiment of FIG. 1.

FIG. 3 is a process flow chart 300 illustrating steps for initiating two-way voice and video communication using face detection according to the embodiment of FIG. 1. In this example, it is assumed that the initiator of the communications session is operating a telecommunications appliance having a display and forward-facing camera.

At step 301 the initiator or third party selects one or more numbers for automatic request propagation as a result of face detection. In one embodiment one number may be preprogrammed for association to a video/voice communications session request. In another embodiment, more than one number might be preprogrammed for initiation of a video/voice communications request. The latter case may be important if one or more parties are un-reachable and the session initiation is due to an emergency of some type. This embodiment may also assume that the person initiating the session request may be unable to operate a hand-held and therefore uses 100% hands-free face detection SW to launch the request. The number or numbers preprogrammed for session initiation may be preprogrammed using voice or by a third party.

At step 301, the initiator or a third party selects one or more telephone numbers for voice/video hands-free session initiation as previously described above. At step 302, the initiator or third party activates the face detection application. The face detection application may have a sleeping mode that uses minimal power. Motion in front of the forward-facing camera may trigger face detection.

At step 303, the initiator makes a decision whether or not to initiate a voice/video session through a face detect operation. If the initiator determines not to make a request at step 303, the application stays asleep at step 304. If the initiator accidentally invokes the face detect application by motion, a few seconds of still posing might be required before a session request is generated and sent. This would enable an initiator the option of opting out of a session initiation operation before the window time or "pose" time is finished. The process resolves back to step 303 from step 304.

If at step 303, the initiator determines to make a voice/video communications session request, then the initiator looks into the appliance camera in order to activate face detection at step 305. The initiator may be required to handle appliance if it is not stationary. In one embodiment, the appliance is fixed or otherwise mounted in a stationary position that is accessible to the initiator. In this case the initiator may simply move in front of the camera space in order for the application to wake up and notice the user. The appliance may be set to speakerphone or the user may wear a headset.

At step 306, the appliance may acquire an image of the initiator and may generate and send a request message containing the image to one or more of the preset numbers telephone numbers (from list). At step 306, if there is more than one preset number, the request may be sent to all of the potential recipients as a request for a video/voice session. If there is only one number in the list, only one recipient will get a request.

At step 307, a message with a thumbnail picture displays on the recipient's appliance. In this case recipients are assumed to be human operators of communications appliances. At step 308 the recipient of a message requesting a voice/video session may make a decision relative to accepting or rejecting the proposed interaction. If at step 308, the recipient determines to reject the request, a call rejection notice may be sent back at step 309 in lieu of a voice/video session. The process would then resolve back to step 304.

If the recipient of a message request for a voice/video session decides to accept the request at step 308, the recipient might interact with the thumbnail representation of the initiator, or may select a preordained button to launch a voice/video call at step 310 to the initiator of the request message of step 306. At step 311, the video session is launched. At the original request initiator's end, the initiator may determine if auto answer is set to on at step 312. If auto answer is not on at step 312, then the initiator of the request may manually answer the video/voice call at step 313. At step 312, if the auto answer is on, the process moves to step 313 where the video session is answered and in progress. After manual answer at step 313, the process resolves to step 314. This example follows the embodiment of FIG. 1.

Figure 4:
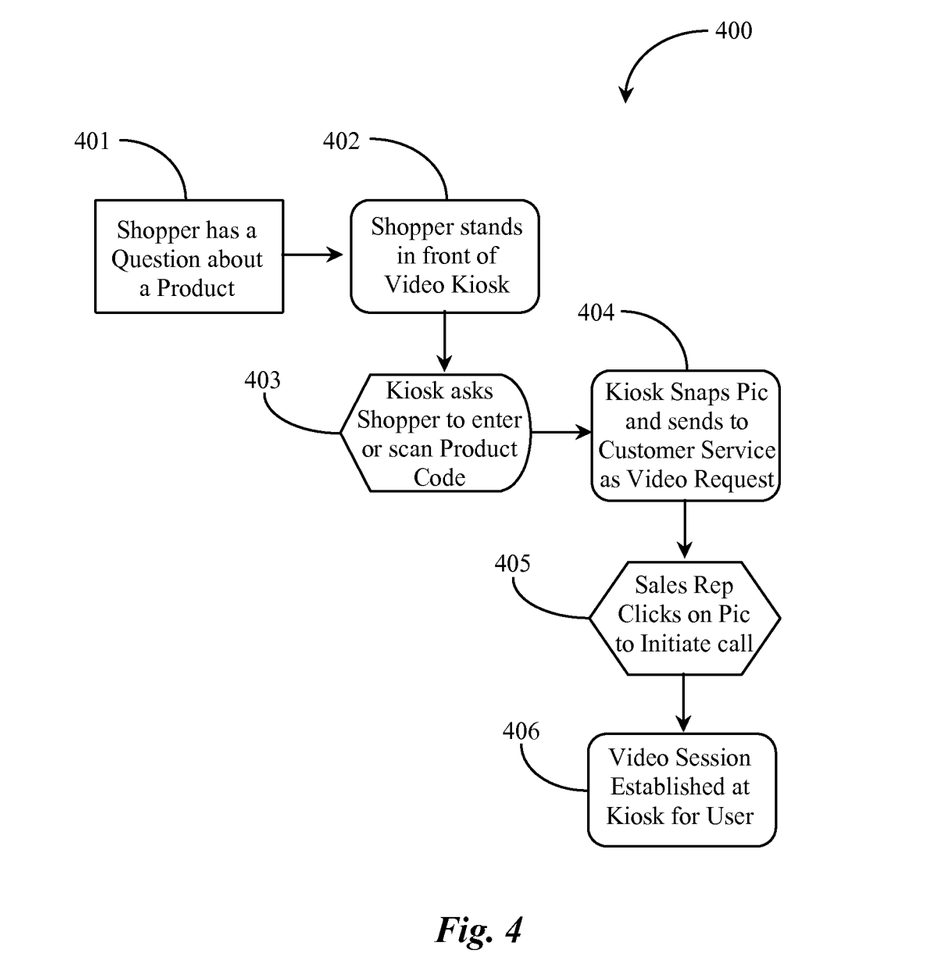
FIG. 4 is a process flow chart illustrating steps for initiating a service communication using face detection according to the embodiment of FIG. 2.

FIG. 4 is a process flow chart 400 illustrating steps for initiating a service communication using face detection according to the embodiment of FIG. 2. Flow chart 400 follows the embodiment of FIG. 2 where it is assumed that the initiator of a video/voice session is a shopper operating a kiosk type terminal. At step 401, the shopper has a question about a product he or she is considering for purchase. At step 402, the shopper moves in front of the video-enabled kiosk analogous to terminal 202 of FIG. 2 with or without the product in question. In one embodiment, the shopper has the product in hand and the kiosk asks the shopper to enter or scan in the product code at step 403.

At step 404, the kiosk acquires an image of the shopper and sends a request including the picture and the product code to customer service as a request for a voice/video session. At step 405, the sales representative that receives the request, which may have been routed to a first available agent, clicks on the thumbnail picture of the shopper to initiate or launch a video/voice call. The product code is also forwarded to the sales rep along with any other data that may be known about the shopper. At step 406, the video/voice session requested is established at the kiosk for the user. After the session, the product may be purchased through the terminal using standard keypad and touch screen payment options.

In one embodiment the act of step 404 may, instead of being a request for a session, may be a session launch that is routed to a next available service representative as an incoming video/voice call. In this case, in step 405 the sales rep would simply accept the call (pick-up). In one embodiment, step 403 in not required and step 405 is not required. In this case, step 406 would call out the session at the terminal of the sales representative picked up as an incoming interaction from the switch or queue.

Figure 5:
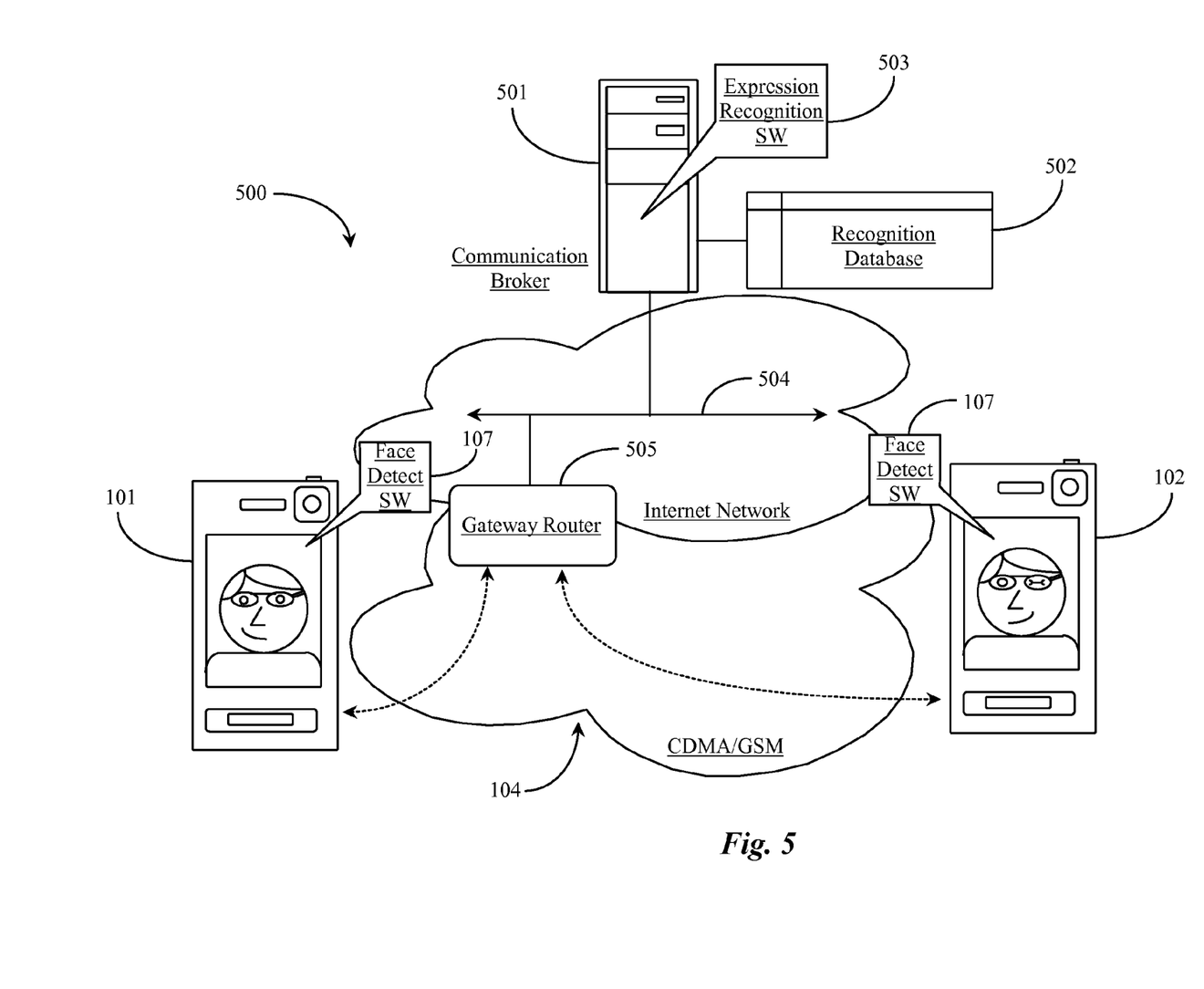
FIG. 5 is an architectural view of a communications network supporting two-way communication using face detection software to initiate a session and face expression recognition to control the session once established.

FIG. 5 is an architectural view of a communications network 500 supporting two-way communication initiated through face detection and that may be controlled during the session using facial expression recognition according to an embodiment of the present invention. Communications network 500 includes CDMA/GSM network 104 and previously described communications appliances 101 and 102 aided by face detection SW 107. Similar to the embodiment described with respect to FIG. 1, face detection SW 107 is utilized on appliance 101 to initiate and send a message to appliance 102 requesting a voice/video communications session.

In this example, a gateway router 505 is illustrated within network 104 for enabling Internet Protocol (IP) based brokerage of the pending communications session. Gateway router 505 may be a multimedia gateway connected to the Internet network. The Internet network is represented herein by a network backbone 504. Backbone 504 represents all of the lines, equipment, and access points that make up the Internet network as a whole. Therefore, there are no geographic limitations to the practice of the present invention. Gateway router 505 is connected to backbone 504 to enable Internet connection for appliances 101 and 102.

A third party server 501 is illustrated and is connected to Internet backbone 504. Server 501 includes a non-transitory digital medium adapted with all of the software and data required to enable function as a communications session broker for sessions engaged in between appliances connected to the network like appliances 101 and 102. Server 501 has an instance of expression recognition SW 503 resident and executable from the non-transitory medium coupled to the server.

Expression recognition SW 503 is adapted with the aid of a connected facial recognition database 502 to enable server 501 to broker communications session established between appliances 101 and 102 that have been established through face detection and subsequent acceptance of a session request. In this example communication is brokered by server 501 through gateway router 505. Examples of facial expression recognition may include but are not limited to nods, head shaking horizontally or vertically, winks, frowns, smiles, and the like. In one embodiment of the present invention facial expressions may help control the session in terms of session termination, direction of session content, destination redirect, and session request routing in case of multiple possible destinations. In an embodiment with multiple routing destinations or departments, a frown may result in a prompt to be routed to customer service department whereas a smile may result in a proactive sales offer. In this case a video-enable IVR (not illustrated) may be employed to detect facial expressions of a session initiator for routing is completed.

In one embodiment, the session requesting appliance is a stationary appliance or otherwise fixed in a stationary position. In this embodiment the face detection application 107 may be left open. Colors may be used to indicate different states of the face detection application. When someone walks inside the field of view of the camera the face detection application may activate by displaying a camera with a colored border. The colors may be an indication of the state of the application. For example, red may indicate the camera does not detect anyone. If the application is left in the red state for a long enough period, the application may go back to sleep. Yellow may indicate that someone is detected and the application is preparing an image from the camera to be sent to the other party. Green may indicate that a notification (request for a voice/video session) was sent to the other party. At this point the other party may choose to launch the video call or the face detection application may back to sleep. A simple motion detection module may be used to determine if someone is in the field of view of the camera. In the embodiment where facial expression recognition is provided, face recognition may also be used to recognize users who have a likeness of them in the form of a frontal image stored in a database. In this way users are recognized and identified by the system.

It will be apparent to one with skill in the art that the communications system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A communication system comprising:
a processor;
an image capturing device; and
a memory, wherein the memory stores instructions that, when executed by the processor, cause the processor to:
preprogram a recipient of a communication prior to monitoring for presence of a user;
monitor an input from the image capturing device for detecting whether or not the user is present;
detect, in response to detecting that the user is present, that the user is still posing for a pose time indicating a desire to transmit a communication request; and
transmit the communication request to the recipient in response to detecting that the user is still posing for the pose time.

2. The communication system of claim 1, wherein the instructions further cause the processor to capture an image of the user in response to detecting that the user is present.

3. The communication system of claim 2, wherein the instructions further cause to processor to capture the image of the user in response to detecting that the user is present after detecting motion in front of the image capturing device.

4. The communication system of claim 2, wherein the instructions further cause the processor to transmit the image to the recipient in response to detecting that the user is present.

5. The communication system of claim 1, wherein detecting whether or not the user is present comprises capturing an image of a face of the user.

6. The communication system of claim 1, wherein the instructions further cause the processor to facilitate a communication session between the user and the recipient in response to the communication request being accepted.

7. The communication system of claim 6, wherein the communication session comprises video and audio communication.

8. The communication system of claim 1, wherein the processor, the memory, and the image capturing device are integrated into a telecommunication device.

9. The communication system of claim 8, wherein the telecommunication device comprises a mobile telephone.

10. The communication system of claim 8, wherein the instructions further cause the processor to monitor facial expressions of the user for controlling the telecommunication device.

11. A communication method comprising:
preprogramming, by a processor, a recipient of a communication prior to monitoring for presence of a user;
monitoring, by the processor, an input from an image capturing device for detecting whether or not the user is present;
detecting, by the processor, in response to detecting that the user is present, that the user is still posing for a pose time indicating a desire to transmit a communication request; and
transmitting, by the processor, the communication request to the recipient in response to detecting that the user is still posing for the pose time.

12. The communication method of claim 11, further comprising capturing an image of the user in response to detecting that the user is present.

13. The communication method of claim 12, further comprising capturing the image of the user in response to detecting that the user is present after detecting motion in front of the image capturing device.

14. The communication method of claim 12, further comprising transmitting the image of the user to the recipient in response to detecting that the user is present.

15. The communication method of claim 11, wherein detecting whether or not the user is present comprises capturing an image of a face of the user.

16. The communication method of claim 11, further comprising facilitating a communication session between the user and the recipient in response to the communication request being accepted.

17. The communication method of claim 16, wherein the communication session comprises video and audio communication.

18. The communication method of claim 11, wherein the processor and the image capturing device are integrated into a telecommunication device.

19. The communication method of claim 18, wherein the telecommunication device comprises a mobile telephone.

20. The communication method of claim 18, further comprising monitoring facial expressions of the user for controlling the telecommunication device.

* * * * *